Patented Nov. 22, 1932

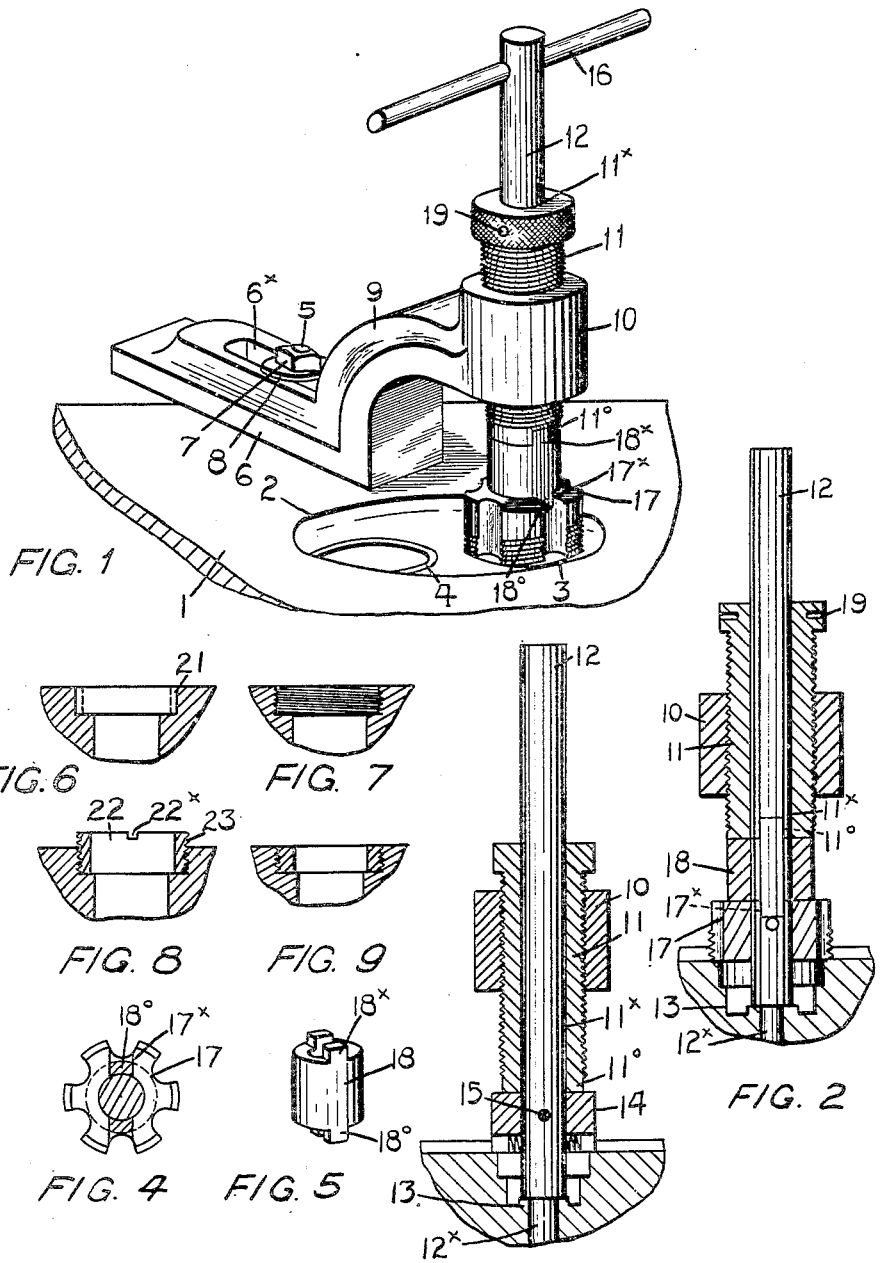

1,888,259

UNITED STATES PATENT OFFICE

RICHARD BURSTON, OF TORONTO, ONTARIO, CANADA

APPARATUS FOR RENEWING VALVE SEATS

Application filed November 21, 1931, Serial No. 576,592, and in Canada July 15, 1931.

My invention relates to improvements in apparatus for renewing valve seats, and the object of the invention is to devise an apparatus by which valve seats may be quickly renewed so that the renewed seat may be held permanently in place without danger of loosening resulting in valve leakage and the necessity of the repeated renewal of valve seats from time to time, and it consists essentially of the arrangement and construction of parts as hereinafter more particularly explained.

Fig. 1 is a perspective view of my apparatus applied to one of the valve orifices of an engine block.

Fig. 2 is a vertical section through the device as shown in Fig. 1 with the tapping tool applied thereto.

Fig. 3 is a similar view to Fig. 2 with the boring tool applied thereto.

Fig. 4 is a sectional plan view through my device taken directly above the tapping tool.

Fig. 5 is a perspective detail of the connecting collar for connecting the tapping tool to the apparatus.

Figs. 6, 7, 8 and 9 are sectional details showing the various steps of my method.

In the drawing like letters of reference indicate corresponding parts in each figure.

1 indicates a fragmentary portion of an engine block provided with the usual circular recess 2 having the valve orifices 3 and 4. 5 are the stud bolts by which the cylinder block cap is secured in place. 6 is a bracket, the main portion of which is in the form of a bar having a central longitudinal slot $6^x$ through which the stud bolt 5 extends, the stud bolt 5 being provided with a nut and washer 7 and 8 by which the bar 6 is clamped in place. The inner end of the bar 6 is provided with an upturned arm 9 terminating in a vertically set internally threaded sleeve bearing 10. 11 is a feed screw provided with an external thread meshing with the internal thread of the sleeve 10 and provided with a central longitudinal orifice $11^x$.

12 is a centering spindle which extends through the sleeve 10 and is provided with a reduced lower end $12^x$ which extends into the ordinary valve guide 13 of the engine. 14 is a boring tool which is secured to the spindle 12 by the key pin 15. In applying my device to the engine the centering pin 12 is inserted in the valve guide 13 so as to project upward centrally of the valve orifice. The sleeve 11 with the bracket 6 connected thereto is then slipped on to the spindle 12 and secured in position by means of the bolt 5, the boring tool 14, of course, being first secured to the spindle 12 as previously described.

The spindle 12 is then rotated by means of the cross bar 16 so as to cut away the material around the orifice 13 as indicated by dotted lines in Fig. 6. As the material is cut away the feed screw formed by the sleeve 11 is threaded down through the bearing 10 against the upper face of the cutting tool 14, this being repeated after every cutting operation until the required depth is reached.

The pin 15 is then knocked out, the centering pin raised, the boring tool 14 removed, and the tapping tool 17 with the spacing sleeve 18 is inserted in place thereof.

It will be noted that the lower end of the feed screw 11 is provided with diametric notches $11^o$ into which fit projections $18^x$. The lower end of the sleeve 18 is provided with similar projections $18^o$ which fit into diametrically aligned notches $17^x$ formed in the upper face of the tapping tool 17.

By this means a driving connection is formed between the feed screw 11 and the tapping tool 17. The feed screw 11 is then turned by means of a pin wrench inserted in the orifice 19. The feed screw then screws down in the bearing sleeve 11 forming the tapping tool 17 in a corresponding direction so as to engage the annular wall of the recess 21 formed by the boring tool 14 as previously described.

The pitch of the thread on the screw 11 corresponds exactly to the pitch of the thread on the tapping tool so that such tapping tool, as the thread is cut, is fed the required distance downward during the operation.

After the recess 21 has been internally threaded as indicated in Fig. 7, an annular valve seat 22 is formed with an external thread 23, such valve seat being of greater depth than the recess 21 as clearly indicated in Fig. 8. The upwardly projecting portion of the seat 22 is provided with diametric notches 22ˣ in which a suitable key or other device may be inserted to screw the seat down tight into the internally threaded recess 21. When this is accomplished the upper projecting portion of the seat 22 is faced off leaving the valve seat in the form shown in Fig. 9.

It will thus be seen that by my apparatus I am able to insert a valve seat so that it will have a maximum tightness and, therefore, will have no danger of loosening during use resulting in a leaking valve.

What I claim as my invention is:

An apparatus for threading an engine block valve seat comprising a stationary centering spindle mounted vertically in the valve spindle guide, a tapping tool freely mounted on the spindle, a bracket securable to an engine block having a vertical bearing sleeve threaded to correspond in pitch to the thread of the tap and having a longitudinal bore through which the centering spindle extends concentrically, a lead screw screwed in the sleeve, and a coupling directly connecting the lead screw and tapping tool.

RICHARD BURSTON.